(12) United States Patent
Snell

(10) Patent No.: US 6,947,740 B2
(45) Date of Patent: Sep. 20, 2005

(54) COMMUNICATION SATELLITE IN A SATELLITE COMMUNICATION SYSTEM WITH HIGH ASPECT RATIO CELL ARRANGEMENT AND SHARED AND ALLOCABLE BANDWIDTH

(75) Inventor: William L. Snell, Monmouth, OR (US)

(73) Assignee: Spacecode LLC, Monmouth, OR (US)

( * ) Notice: Subject to any disclaimer, the term of this patent is extended or adjusted under 35 U.S.C. 154(b) by 359 days.

(21) Appl. No.: 10/172,736

(22) Filed: Jun. 13, 2002

(65) Prior Publication Data

US 2003/0232596 A1 Dec. 18, 2003

(51) Int. Cl.[7] .............................................. H04Q 7/20
(52) U.S. Cl. .................... 455/427; 455/12.1; 455/447; 455/446; 455/453
(58) Field of Search ............................. 455/427, 12.1, 455/447, 446, 453; 343/781 P, 700 R, 737, 742

(56) References Cited

U.S. PATENT DOCUMENTS

| | | | |
|---|---|---|---|
| 5,771,449 A | * | 6/1998 | Blasing et al. ........... 455/422.1 |
| 5,963,175 A | * | 10/1999 | Burr ....................... 343/781 P |
| 6,157,811 A | * | 12/2000 | Dent ......................... 455/12.1 |
| 6,587,687 B1 | * | 7/2003 | Wiedeman .................. 455/428 |
| 2002/0032003 A1 | * | 3/2002 | Avitzour et al. ............ 455/12.1 |
| 2003/0156570 A1 | * | 8/2003 | Alamouti et al. ........... 370/347 |

* cited by examiner

Primary Examiner—Sonny Trinh
Assistant Examiner—Huy Phan
(74) Attorney, Agent, or Firm—Ipsolon LLP

(57) ABSTRACT

A communication satellite in a satellite communication system has multiple communication signal transmit horns or other transmit antenna (e.g., phased arrays) that transmit communication downlink signals to multiple corresponding terrestrial communication cells. The satellite includes first and second contiguous, high aspect ratio arrangements of the transmit horns. The first and second arrangements of transmit horns have allocated to them respective first and second orthogonal communication band segments. The first communication band segment is shared and fully allocable among the transmit horns of the first arrangement, and the second communication band segment is shared and fully allocable among the transmit horns of the second arrangement. The high aspect ratios of the first and second transmit horn arrangements result in corresponding high aspect ratios for terrestrial communication cell arrangements that can utilize well the allocable bandwidth of each communication band segment. The shared and fully allocable bandwidth of the communication band segments for each arrangement of transmit horns avoids the chronic under-capacity and over-capacity that can arise with fixed bandwidth allocations to adjacent cells.

20 Claims, 7 Drawing Sheets

US 6,947,740 B2

COMMUNICATION SATELLITE IN A SATELLITE COMMUNICATION SYSTEM WITH HIGH ASPECT RATIO CELL ARRANGEMENT AND SHARED AND ALLOCABLE BANDWIDTH

FIELD OF THE INVENTION

The present invention relates to satellite communication systems and, in particular, to a communication satellite in a satellite communication system with a high aspect ratio arrangement of communication cells that have shared and allocable bandwidth.

BACKGROUND AND SUMMARY OF THE INVENTION

Conventional communication satellites provide downlink communication signals to multiple terrestrial communication cells that extend over a geographic region. The downlink communication signals are typically carried over a range of frequency channels within a predefined frequency spectrum or band (e.g., the Ku-band). To prevent interference between downlink communication signals, different ranges of frequency channels are typically directed to adjacent terrestrial communication cells.

For example, U.S. Pat. No. 6,275,479 describes adjacent communication cells as each having allocated to it a fixed sub-band, such as one-third of a full Ku-band spectrum. Selected positioning of the communication cells can prevent adjacent communication cells from utilizing the same fixed sub-band of the available frequency spectrum. This reduces or eliminates interference between communication signals of adjacent communication cells.

An aspect of the present invention is an appreciation that terrestrial regions corresponding to adjacent communication cells can have dramatically different communication bandwidth requirements. In the context of a prior bandwidth allocation of the type described in U.S. Pat. No. 6,275,479, some communication cells may have chronically inadequate bandwidth capacity while nearby cells consistently have excess bandwidth capacity. The conventional fixed bandwidth allocations can limit the extent to which bandwidth resources can be allocated among communication cells.

Accordingly, another aspect of the present invention is a communication satellite in a satellite communication system, the satellite having multiple communication signal transmit horns, for example, that transmit communication downlink signals to multiple corresponding terrestrial communication cells. The satellite includes first and second contiguous, high aspect ratio arrangements of the transmit horns. The first and second arrangements of transmit horns have allocated to them respective first and second orthogonal communication band segments. The first communication band segment is shared and fully allocable among the transmit horns of the first arrangement, and the second communication band segment is shared and fully allocable among the transmit horns of the second arrangement.

The transmit horns, either alone or with reflectors (e.g., parabolic reflectors), are just an exemplary implementation of transmit antennas for transmitting the communication downlink signals. Any other transmit antenna structure could be alternatively used, including phased array structures.

The shared and fully allocable bandwidth of the communication band segment for each arrangement of transmit horns avoids the chronic under-capacity and over-capacity that can arise with fixed bandwidth allocations to adjacent cells. In addition, the high aspect ratios of the first and second transmit horn arrangements result in corresponding high aspect ratios for terrestrial communication cell arrangements that can utilize well the allocable bandwidth of each communication band segment.

In one implementation, the multiple corresponding terrestrial communication cells deliver satellite downlink signals to high aspect or shaped arrangements of cells with aspect ratios of at least about 4:1, for example. Longitudinally adjacent high aspect arrangements of cells receive the full band in respective first and second orthogonal communication formats. With respect to Ku-band communications, for example, each high aspect communication cell arrangement would receive the full nominal 500 MHz bandwidth of the Ku-band. In other implementations, each high aspect communication cell arrangement could receive band segments that are less than the full communication bandwidth.

The full band first and second orthogonal communication band segments delivered to longitudinally adjacent high aspect arrangements of cells may also overlap a majority of each longitudinally adjacent high aspect arrangement of cells. Such overlapping may occur without interference due to the orthogonality of the communication bands delivered to longitudinally adjacent high aspect arrangements of cells. In addition, such overlapping allows the bandwidth of the overlapping communication band to be selectively used in the overlapped arrangement of cells. With overlapping, mutually orthogonal (or otherwise distinguished) full band satellite downlink signal capacity availability, each arrangement can selectively receive up to twice the full band communication capacity, thereby providing a two-time full frequency re-use system. Such an implementation may be characterized as dual-polarization bandwidth allocation and re-use optimization by isomorphic two-color pseudo-mapping.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
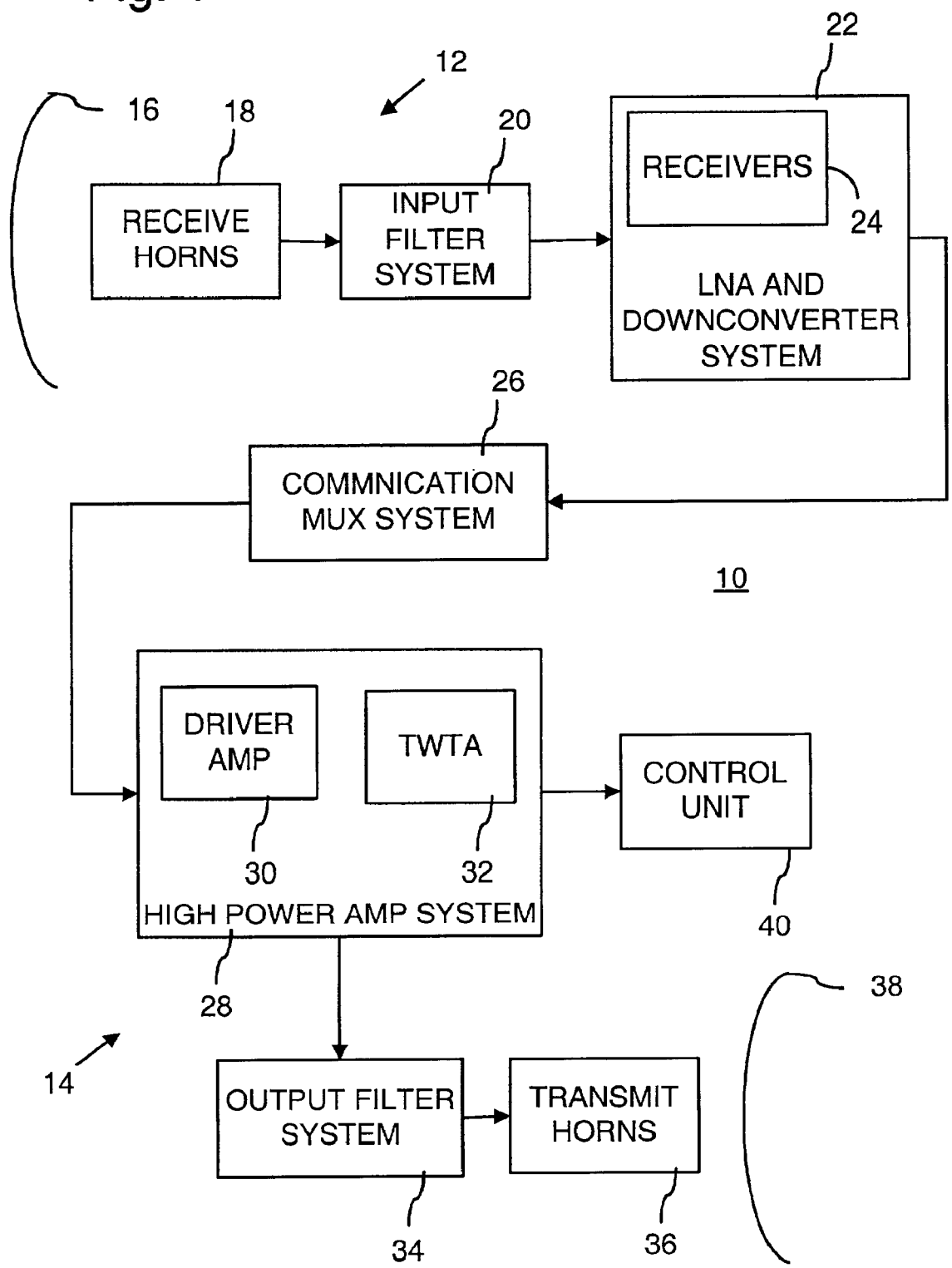
FIG. 1 is a block diagram illustrating a communication satellite.

FIG. 1 is a block diagram of an exemplary implementation of a communication satellite 10 in geosynchronous orbit as part of a satellite communication system and having a communication signal receiving system 12 and a communication signal transmitting system 14. Receiving system 12 includes a satellite receiving reflector 16 that receives multiple communication uplink signals from one or more terrestrial transmitting stations and concentrates the signals at corresponding ones of multiple receiving horns 18. Receiving horns 18 pass the communication uplink signals through an input filter system 20 to a satellite low noise amplifier (LNA) and downconverter system 22 having multiple individual receivers 24. Each of the uplink communication signals may include multiple separate signals.

Low noise amplifier (LNA) and downconverter system 22 would typically include more individual receivers 24 than are necessary for the number of signals or channels to be handled by satellite 10. The additional receivers 24, or other components, provide redundancy and may be utilized upon the failure of any individual component. Such redundancy is typically utilized in satellite design and may be applied as well as in other systems within satellite 10 that are described below.

Accordingly, low noise amplifier (LNA) and downconverter system 22 includes switching arrays to route each channel of the uplink signal to the corresponding active receivers 24 that provide pre-amplification of the uplink communication signals and convert them to another (e.g., lower) frequency. For example, uplink signals may be Ku-band signals (i.e., about 14 GHz) or V-band signals (i.e. about 49–50 GHz), which may be converted to lower Ku-band frequencies 11–12 GHz). A communication multiplexer system 26 receives the low noise amplified and frequency converted uplink signals and channelizes and routes the signals to appropriate ones of redundant high power amplifiers in a high power amplifier system 28 in transmitting system 14 for transmission to terrestrial recipient stations. In an implementation utilizing FDMA routing techniques, multiplexer 26 channelizes and routes the signals according to their carrier frequencies.

Amplifier system 28 may employ, for example, driver amplifiers 30 with associated power amplifiers (e.g., traveling wave tube amplifiers 32 or solid-state amplifiers). Traveling wave tube amplifiers 32 provide high reliability, high power output amplification. The outputs of high power amplifier system 28 are connected through an output filter system 34 to one or more transmit horns 36 for transmission as a downlink signal via a satellite transmit reflector 38. A control unit 40 is bus connected to various ones of these components to control their operation and interaction. The satellite includes power sources, orientation and position control systems, communication control systems, etc. as are known in the art.

It will be appreciated that transmit horns 36, either alone or with reflector (e.g., parabolic) 38, are an exemplary implementation of transmit antennas for transmitting the communication downlink signal. Any other transmit antenna structure could be alternatively used, including phased array structures. The following description is directed by way of example to a transmit antenna implemented with transmit horns 26 and reflector 38. The description is similarly applicable to any other transmit antenna structure, including a phased array.

Figure 2:
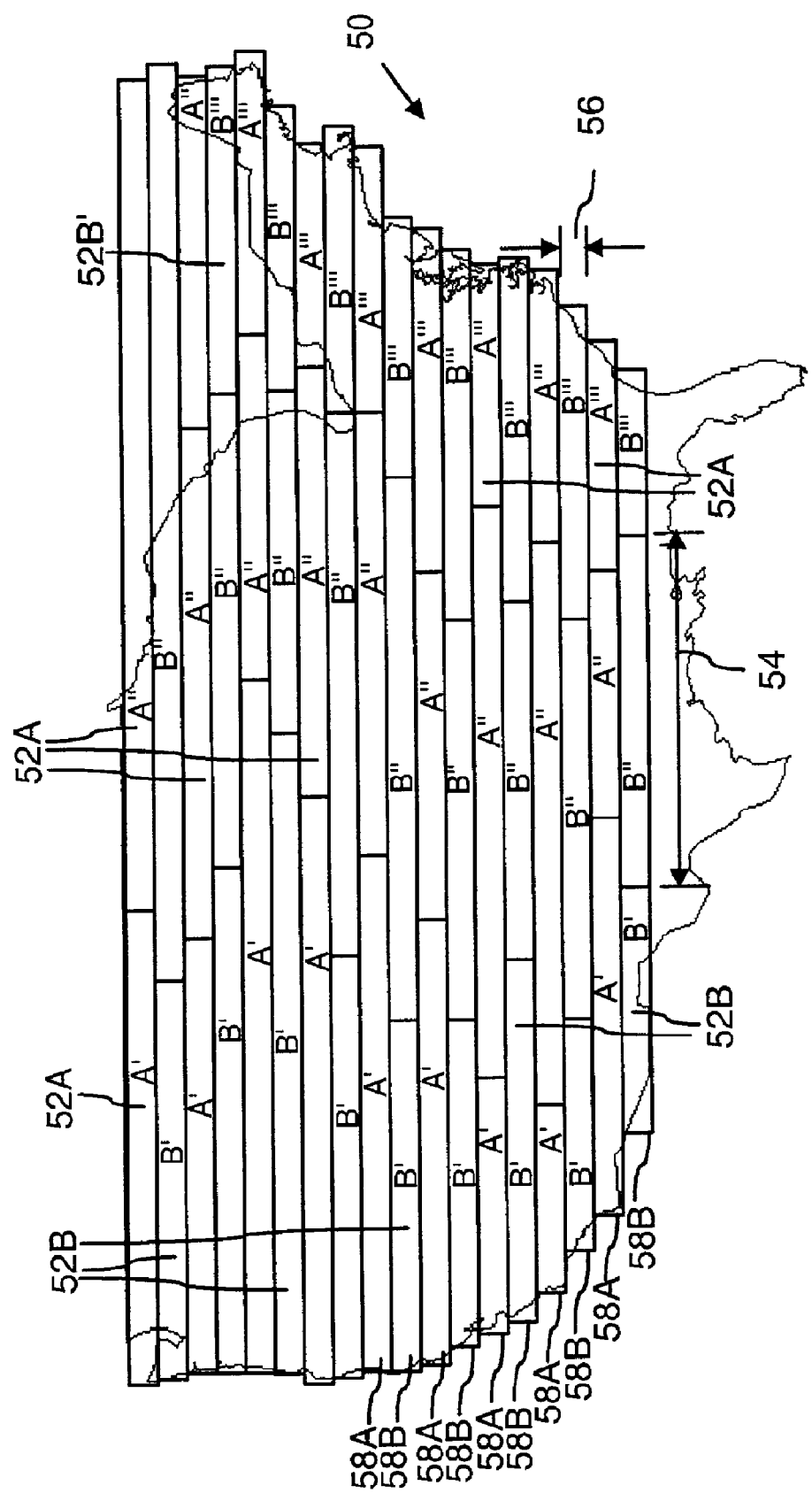
FIG. 2 is an illustration of a satellite telecommunications region having multiple high aspect communication cell arrangements.

FIG. 2 is an illustration of a satellite telecommunications region 50 having multiple high aspect or shaped communication cell arrangements 52A and 52B (represented by rectangles) to which narrow zone communication signals are directed to recipient stations by a geosynchronous satellite, as described below in greater detail. It will be appreciated that the geographic regions shown in FIG. 2 is merely illustrative and that operation of the present invention is applicable to other geographic regions.

Each high aspect communication cell arrangement 52A or 52B corresponds to a different geographic area within region 50 and is characterized as having a long dimension 54 and a short dimension 56 that together define a high aspect ratio of at least about 3-to-1 or 4-to-1. In accordance with the present invention, the aspect ratios of high aspect communication cell arrangements 52A and 52B can be arbitrarily high.

High aspect communication cell arrangements 52A are positioned generally end-to-end in rows 58A that alternate with rows 58B of high aspect communication cell arrangements 52B that are positioned generally end-to-end. Rows 58A and 58B of respective high aspect communication cell arrangements 52A and 52B receive from satellite 10 distinguished or orthogonal downlink signals that have distinguishing or orthogonal downlink signal characteristics. For example, rows 58A and 58B of respective high aspect communication cell arrangements 52A and 52B could receive downlink signals of respective first and second frequencies or of opposed polarizations. Opposed linear polarizations can be referred to as horizontal and vertical, but may in fact be oriented in any pair of perpendicular directions. Opposed circular polarizations can be referred to as right-circular and left-circular polarizations.

A variety of other downlink signal characteristics could be used to distinguish the downlink signals received by rows 58A and 58B of respective high aspect communication cell arrangements 52A and 52B, such as by using TDMA and CDMA techniques. For example, rows 58A and 58B of respective high aspect communication cell arrangements 52A and 52B could receive downlink signals of different time slots or scrambled by different orthogonal or near-orthogonal codes. Examples of other downlink signal characteristics or interference suppression techniques that can be used include use of joint detection, successive interference cancellation, or parallel interference cancellation and code division in which signals are spread over a band and assigned pseudo-random codes. It will be appreciated that any of these exemplary distinguishing or orthogonal downlink signal characteristics, or others, may be used alone or together in any combination.

Each row 58A or 58B includes at least one, and typically includes multiple, high aspect communication cell arrangements 52A and 52B, respectively. The following description is made with reference to rows 58A and high aspect communication cell arrangements 52A, but is similarly applicable to rows 58B and high aspect communication cell arrangements 52B.

Adjacent high aspect communication cell arrangements 52A are distinguished as A', A'', or A'''. An aspect of the present invention is that satellite 10 is capable of delivering to each high aspect communication cell arrangement 52A a full satellite communication band. In an implementation employing Ku-band satellite communication, for example, satellite 10 is capable of delivering to each high aspect communication cell arrangement 52A the full nominal 500 MHz bandwidth of the Ku-band. Interference is prevented from occurring between adjacent rows 58A and 58B by use of the distinguishing or orthogonal downlink signal characteristics in those respective rows. Adjacent high aspect communication cell arrangements 52A (i.e., A', A'', or A''') are generally spatially isolated from each other with only a proportionally small boundary region between them, as described below in greater detail.

Figure 3:
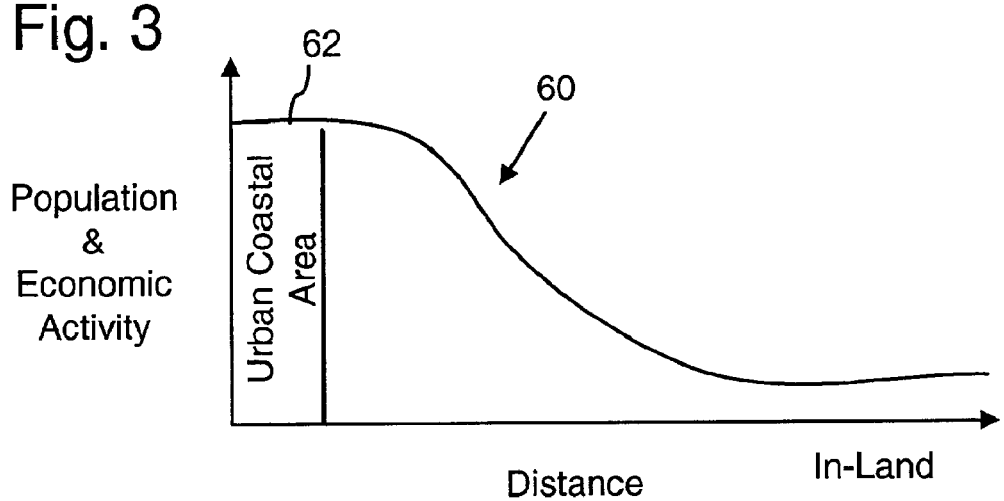
FIG. 3 is a graph illustrating a characteristic distribution of population and economic activity in relation to distance inland from a typical urban coastal area.

FIG. 3 is a graph 60 illustrating a characteristic distribution of population and economic activity in relation to distance inland from a typically urban coastal area 62. Graph 60 reflects the common characteristic that population and per-capita economic activity typically decrease with distance inland from an urban coastal area 62. By some indications, proportions of gross domestic product attributable to urban coastal areas can be about 8 times the proportions of gross domestic product attributable to inland areas. It will be appreciated, however, that graph 60 is merely illustrative and that actual distributions of population and economic activity at different locations around the world will differ from the characteristic distribution of graph 60.

The population and economic activity distribution of graph 60 can represent an approximation of expected bandwidth requirements for satellite communications in different areas. Accordingly, an aspect of the present invention is an appreciation that a communication satellite using high aspect communication cell arrangements 52 may provide improved matching of communication satellite bandwidth to the expected bandwidth requirements for satellite communications in different areas. In one implementation, high aspect communication cell arrangements 52 (FIG. 2) may be formed with lengths that are generally proportional to overall population density encompassed by the cell arrangements. Hence, high aspect communication cell arrangements 52 may commonly be of different lengths.

The population and economic activity, at any given hour in a day, is also distributed across multiple time zones. Accordingly, an aspect of the present invention is an appreciation that a communication satellite using high aspect communication cell arrangements 52 may provide improved matching of communication satellite bandwidth to the expected bandwidth requirements for satellite communications in different time zones. In one implementation, high aspect communication cell arrangements 52 (FIG. 2) may be formed with lengths that cross more than one time zone. As bandwidth requirements for satellite communications decrease for one time zone, the bandwidth requirements for satellite communications increase for the next time zone.

Figure 4:
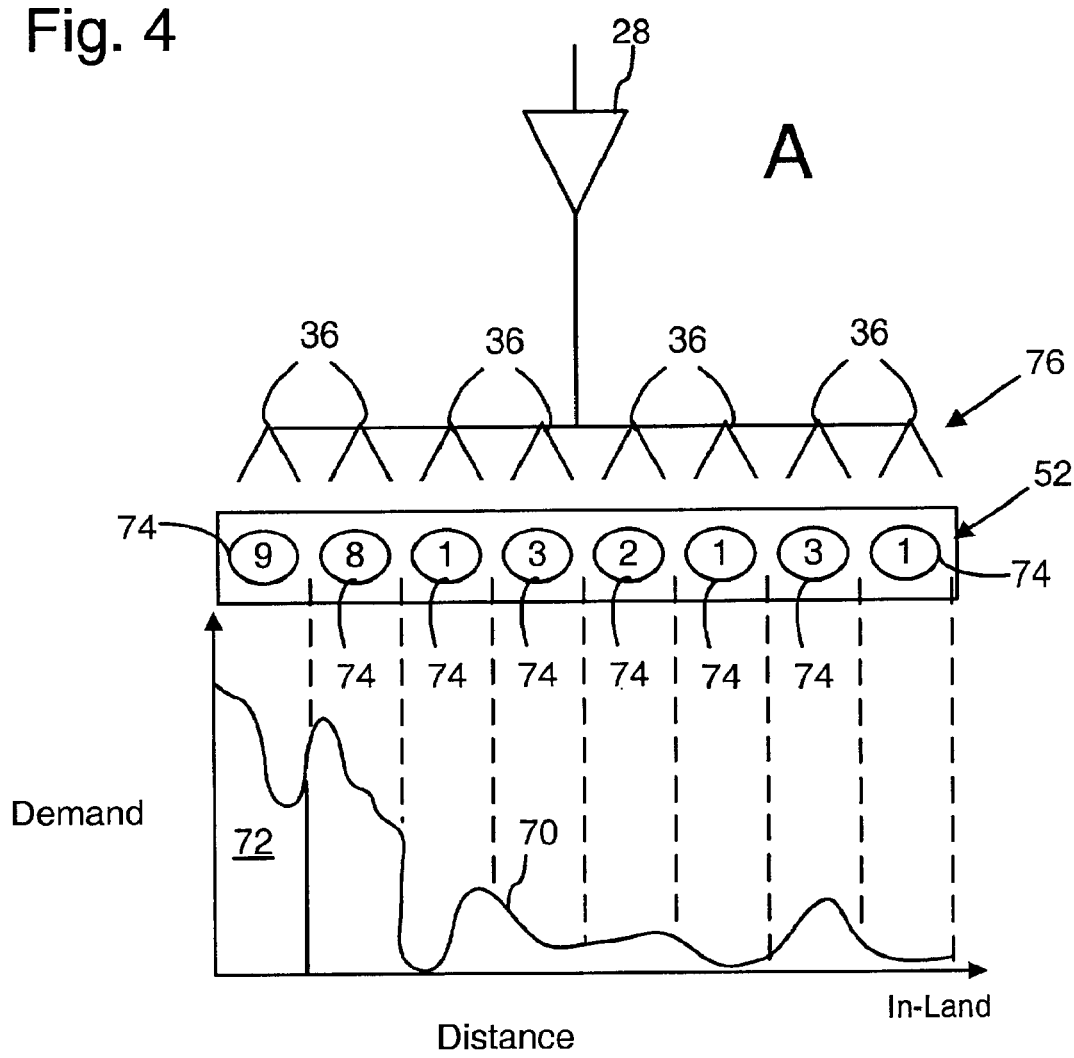
FIG. 4 is a schematic representation of an exemplary high aspect communication cell arrangement positioned in relation to a graph illustrating an exemplary distribution of bandwidth demand for satellite communications.

FIG. 4 is a schematic representation of an exemplary high aspect communication cell arrangement 52 positioned in relation to a graph 70 illustrating an exemplary distribution of bandwidth demand for satellite communications in relation to distance inland from a typically urban coastal area 72. The bandwidth demand of graph 70 indicates a spatial variation with respect to distance from urban coastal area 72 and relates generally to the characteristic distribution of graph 60.

In addition, the bandwidth demand illustrated by graph 70 could also vary over time so that different areas represented in graph 70 could have different levels of demand at different times. High aspect communication cell arrangement 52 in FIG. 3 includes multiple separate cells 74 that correspond to an exemplary high aspect arrangement 76 of transmit horns 36 included in communication signal transmitting system 14 of satellite 10 and driven by a common amplifier system 28. For purposes of illustration, each cell 74 of FIG. 4 indicates a relative value (e.g., over a range of 0–10) of download bandwidth that is attributed to the cell in accordance with the bandwidth demand for the cell indicated in graph 70.

Figure 5:
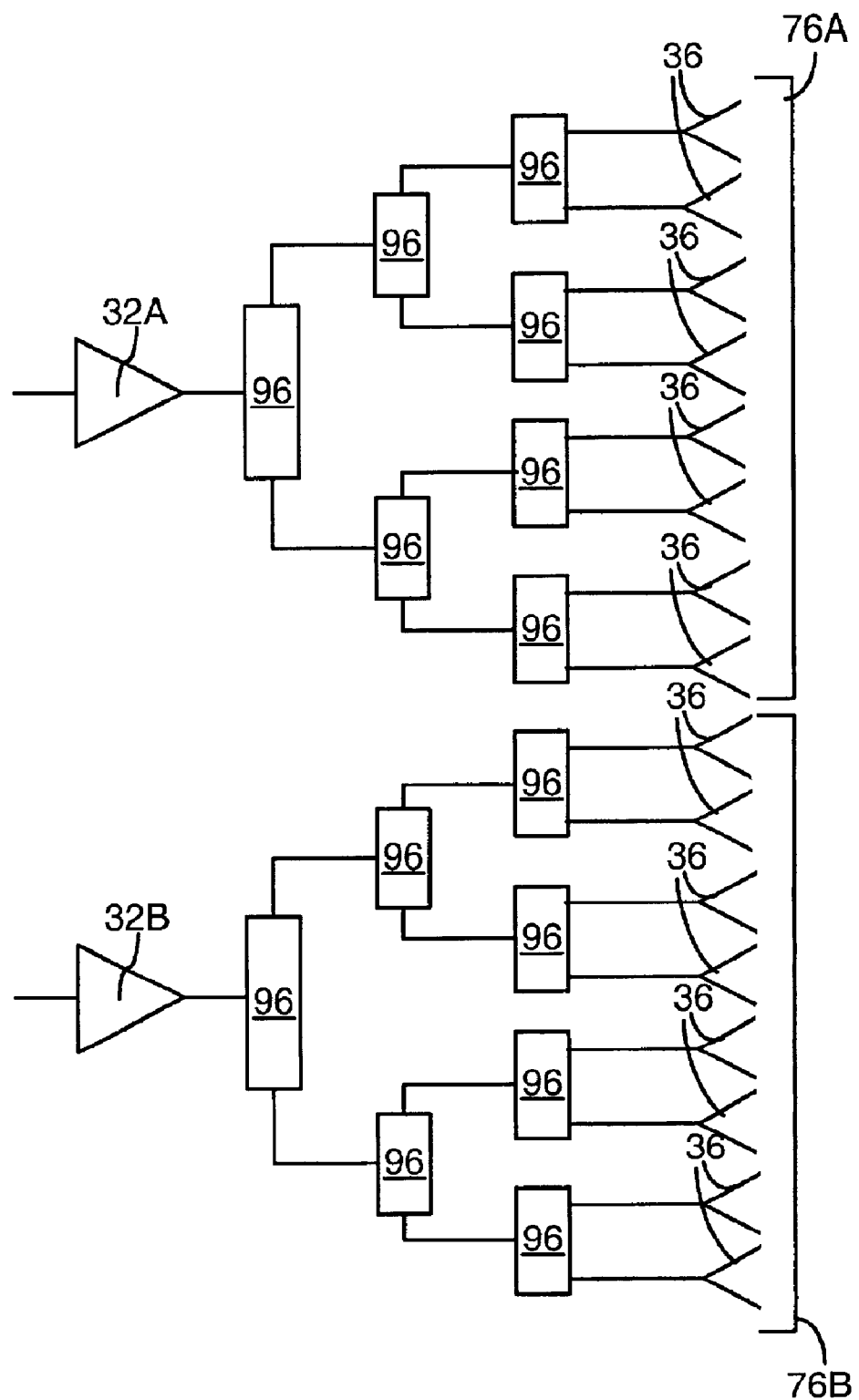
FIG. 5 is a circuit block diagram of an exemplary implementation of a communication signal transmitting system.

FIG. 5 is a circuit block diagram of an exemplary implementation of communication signal transmitting system 14. A pair of traveling wave tube (TWT) amplifiers 32A and 32B, such as those described with reference to FIG. 1, are coupled to a respective pair of high aspect arrangements 76A and 76B of transmit horns 36. High aspect arrangements 76A and 76B of transmit horns 36 may correspond, for example, to the respective A and B representations of high aspect communication cell arrangements 52 (FIG. 2).

Each transmit horn 36 transmits a downlink communication signal to a corresponding cell (e.g., one of cells 74 indicated in FIG. 4) of a high aspect communication cell arrangement 52. FIG. 5 shows each of high aspect arrangements 76A and 76B as including 8 transmit horns 36. It will be appreciated, however, that each of high aspect arrangements 76A and 76B could include an arbitrary number of transmit horns 36 and that communication signal transmitting system 14 could include more than two high aspect arrangements 76A and 76B. The transmit horns 36 of each arrangement 76A and 76B are arranged in relation to a transmit reflector 38 that is configured to transmit particular communication signals to particular ones of cells 74 while maintaining high aspect communication cell arrangement 52.

In one implementation, each of TWT amplifiers 32A and 32B is adapted to amplify and transmit the full spectrum or bandwidth of a satellite downlink communication band, such as all of the nominal 500 MHz bandwidth of a Ku-band downlink communication band (i.e., 12.200–12.700 GHz). It will be appreciated that references to the Ku-band downlink communication band is only illustrative and is not a limitation on the scope of application for transmitting system 14.

A series of separately-controllable power/bandwidth dividers 96 coupled between each of TWT amplifiers 32A and 32B and the respective high aspect arrangements 76A and 76B of transmit horns 36. With regard to high aspect arrangements 76B, for example, power/bandwidth dividers 96 function to allocate to each transmit horn 36 in the arrangement a selected proportion of the downlink communication band to be transmitted to the corresponding cell 74 in accordance with the bandwidth requirements of the cell.

High aspect arrangements 76A and 76B of transmit horns 36 each use a shared and allocable spectrum of a downlink communication band that is directed to a corresponding contiguous high aspect arrangement 52 of cells 74. In one implementation, each high aspect arrangements 76A and 76B of transmit horns 36 uses the same spectrum of a downlink communication band (e.g., the nominal 500 MHz bandwidth of a Ku-band downlink communication band). As described above, adjacent high aspect communication cell arrangements 52 (indicated by the notations A and B) could receive downlink signals of respective first and second opposed polarizations to prevent downlink signal interference between the adjacent high aspect communication cell arrangements 52.

This shared and allocable use of a wide (e.g., full) spectrum of a downlink communication band spectrum in contiguous high aspect arrangement 52 of cells 74 supports large variations in bandwidth allocations between adjacent cells 74. For example, an adjacent pair of cells 74 in FIG. 4 receive proportional bandwidth allocations of 8 and 1. These large variations in bandwidth allocations in combination with the high aspect arrangements 76A and 76B of transmit horns 36 allow a satellite of the present invention to accommodate the significant and spatially close bandwidth demand variations that commonly occur, as described with reference to FIGS. 3 and 4.

In contrast, prior satellite configurations allocate fixed segments of downlink communication band spectrum among adjacent communication cells. As described in U.S. Pat. No. 6,275,479, for example, adjacent communication cells are allocated a fixed sub-band, such as one-third of a full Ku-band spectrum. In the context of the significant and spatially close bandwidth demand variations that can commonly occur, as described with reference to FIGS. 3 and 4, such fixed bandwidth allocations can limit the extent to which bandwidth resources can be allocated among communication cells.

Figure 6:
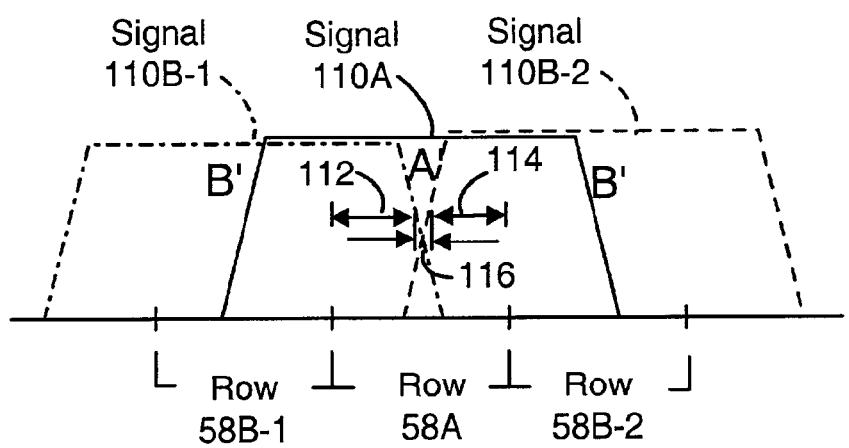
FIG. 6 is a schematic illustration of one implementation of a power distribution of satellite downlink signals delivered to an exemplary triplet of adjacent rows of cell arrangements.

FIG. 6 is a schematic illustration of one implementation of a power distribution of satellite downlink signals 110B-1, 110A, and 110B-2 delivered to an exemplary triplet of adjacent rows 58B, 58A, and 58B. The schematic illustration of FIG. 6 is analogous to a cross-sectional view of the power distribution of satellite downlink signals 110B-1, 110A, and 110B-2 delivered to an exemplary triplet of adjacent rows 58B, 58A, and 58B. This illustration and the following description of FIG. 6 are similarly applicable to any triplet of adjacent rows 58A and 58B within satellite telecommunications region 50 (FIG. 2).

The power distributions of satellite downlink signals 110B-1, 110A, and 110B-2 provide primary satellite communication signal coverage to respective rows 58B-1, 58A, and 58B-2. Primary satellite communication signal coverage provides maximum (e.g., full) power capability to those regions. As is known in the art, power capability generally corresponds to communication signal bandwidth or capacity. In exemplary implementations of the present invention, the full power capability corresponds to full bandwidth of a satellite communication band, such as the Ku-band, for example.

In addition to providing primary satellite communication signal coverage to rows 58B-1, 58A, and 58B-2, power distributions of respective satellite downlink signals 110B-1, 110A, and 110B-2 overlap into the adjacent rows. With respect to row 58A, less than maximum (e.g., full) power capability from downlink signals 110B-1 and 110B-2 overlap into row 58A.

Figure 7:
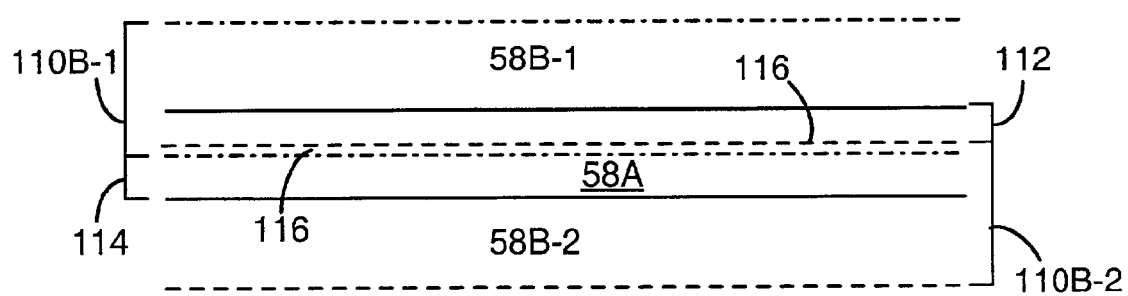
FIG. 7 is a plan view illustrating overlapping of downlink signals between adjacent rows.

FIG. 7 is a plan view illustrating overlapping of downlink signals 110B-1 and 110B-2 into row 58A. The overlapping downlink signals 110B-1 and 110B-2 do not interfere with downlink signal 110A because orthogonal (or otherwise distinguished) downlink signals are delivered to adjacent rows 58A and 58B, as described hereinabove. Within row 58A, downlink signal 110B-1 in an overlap region 112 is operable to deliver communication signals without interference downlink signal 110A or appreciable interference from downlink signal 110B-2. Downlink signal 110B-2 in an overlap region 114 is operable to deliver communication signals without interference downlink signal 110A or appreciable interference from downlink signal 110B-1.

In a longitudinal, central, mutually overlapping region 116, the relatively similar powers of both interfering downlink signals 110B-1 and 110B-2 will cause them to interfere with each other. However, either of downlink signals 110B-1 and 110B-2 would be operable to deliver communication signals without interference downlink signal 110A. Moreover, both downlink signals 110B-1 and 110B-2 operating together can cooperate to deliver communication signals with sufficient power to region 116 by combining identical channels, in phase.

The rows 58 of communication cell arrangements 52A with overlapping, mutually orthogonal (or otherwise distinguished) full band satellite downlink signals 110 provide each row (e.g., row 58A) with up to twice the full band communication capacity, thereby providing a two-time full frequency re-use system. For example, one full band of communication capacity is provided by satellite downlink signal 110A as the primary satellite communication signal coverage to rows 58A. In addition, satellite downlink signals 110B-1 and 110B-2 can provide full band of communication capacity to overlap regions 112 and 114 respectively and to overlap region 116 together.

It will be appreciated that while they are providing full band of communication capacity to respective overlap regions 112 and 114, satellite downlink signals 110B-1 and 110B-2 are not providing communication capacity to respective rows 58B-1 and 58B-2. However, this capability to provide supplemental communication capacity can allow a dramatic increase in bandwidth over the maximum ⅓ bandwidth otherwise available.

In addition to adding capacity by overlapping adjacent orthogonal satellite downlink signals onto a primary satellite communication signal, this implementation reduces or eliminates requirements for redundant amplifiers 32 on satellite 10. In the case of a failed amplifier 32, for example, either or both the amplifiers 32 providing the overlapping adjacent orthogonal satellite downlink signals can provide satellite downlink signals to the cells of the failed amplifier 32.

The power distributions of satellite downlink signals 110A, 110B-1 and 110B-2 are characterized as having steep gain slopes with minimal side lobes (not shown). Such minimal side lobes may be created by any of the following techniques, either alone or in any combination: tapered illumination (transform apodisation) and surface phase control, shaping and aperture, for example.

Figure 8:
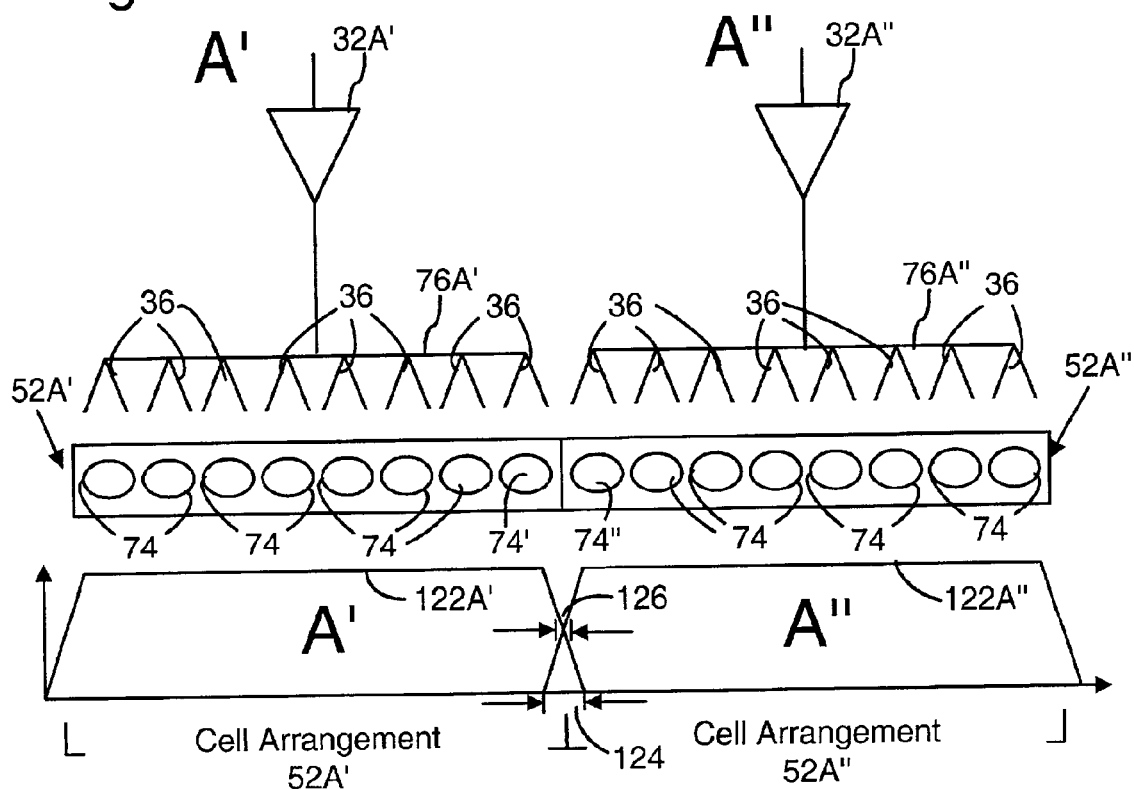
FIG. 8 is a schematic illustration of one implementation of a power distribution of satellite downlink signals delivered to an exemplary pair of exemplary high aspect communication cell arrangements within a row.

FIG. 8 is a schematic illustration of one implementation of a power distribution of satellite downlink signals 122A' and 122A" delivered to an exemplary pair of exemplary high aspect communication cell arrangements 52A' and 52A" in a row 58A. Downlink signals 122A' and 122A" are shown in relation to high aspect arrangements 76A' and 76A" of transmit horns 36 for purposes of illustration. The following description is made with high aspect communication cell arrangements 52A, but is similarly applicable to high aspect communication cell arrangements 52B.

The power distributions of satellite downlink signals 122A' and 122A" provide primary satellite communication signal coverage to respective cell arrangements 52A' and 52A". In addition to providing primary satellite communication signal coverage to cell arrangements 52A' and 52A", power distributions of respective satellite downlink signals 122A' and 122A" overlap into the ends of the adjacent cell arrangements. Less than maximum (e.g., full) power capability from downlink signals 122A' and 122A" overlap into respective cell arrangements 52A" and 52A' in an overlap region 124.

Figure 9:
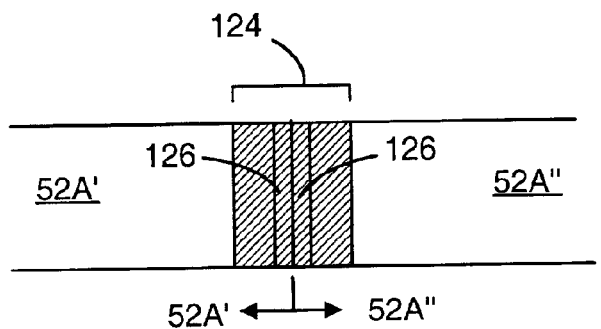
FIG. 9 is an enlarged plan view illustrating overlap region of satellite downlink signals for the exemplary pair of exemplary high aspect communication cell arrangements of FIG. 8.

FIG. 9 is an enlarged plan view illustrating overlap region 124. Except within an inner overlap region 126, the overlapping downlink signals 122A' and 122A" do not interfere with each other because the relative magnitudes of the overlapping downlink signals 122A' and 122A" are distinct enough that the primary satellite communication signal for the region can be distinguished from the overlapping signal (i.e., the signal-to-noise ratio between the two signals is great enough to properly distinguish the intended signal).

Within inner overlap region 126, however, the relative amplitude ratios between the overlapping downlink signals 122A' and 122A" is insufficient for the primary satellite communication signal for the region to be distinguished from the overlapping signal (i.e., the signal-to-noise ratio between the two signals is not great enough to properly distinguish the intended signal).

Figure 10:
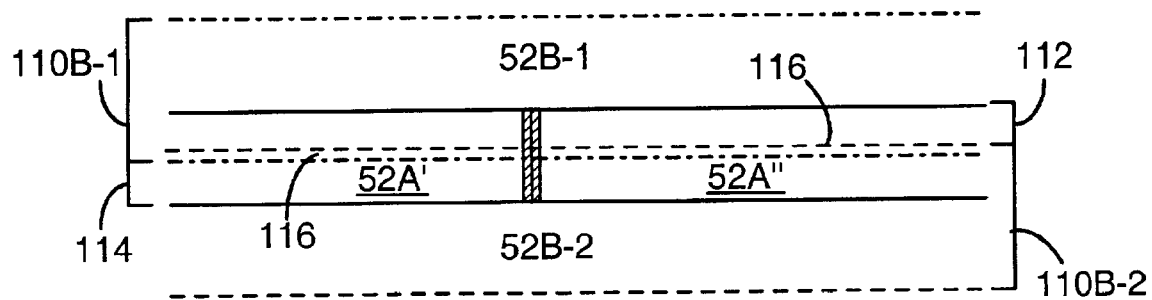
FIG. 10 combines the illustrations of FIGS. 7 and 9.

In accordance with the present invention, however, satellite communication signals can be transmitted to locations corresponding to inner overlap region 126 by transmission of complementary or compatible downlink signals to adjacent cells 74A' and 74A" that bound and encompass inner overlap region 126. In particular, downlink signals 122A' and 122A" will typically be of the same orthogonality (e.g., polarization). A satellite communication signal can be transmitted to locations corresponding to inner overlap region 126 generally without interference by transmitting the signal as in phase downlink signals 122A' and 122A" to adjacent cells 74A' and 74A". FIG. 10 combines the illustrations of FIGS. 8 and 10 to illustrate the capability of accommodating and using overlapping downlink signals both adjacent rows 58 and adjacent cell arrangements 52.

Figure 11:
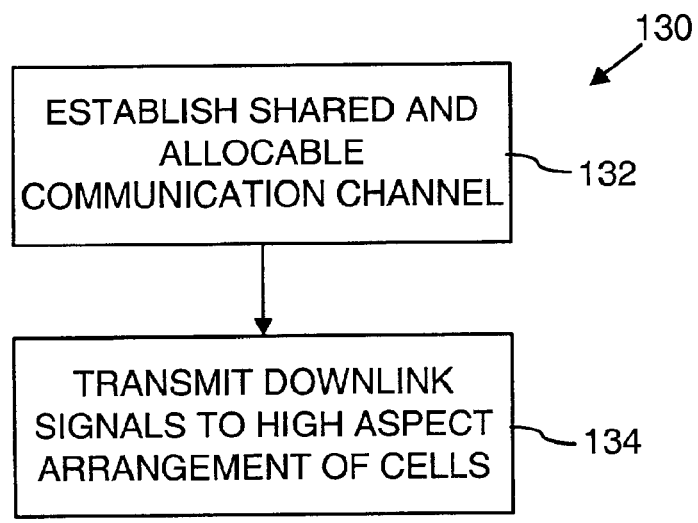
FIG. 11 is a flow diagram illustrating a method of transmitting communication downlink signals to plural corresponding terrestrial communication cells.

FIG. 11 is a flow diagram illustrating a method 130 of transmitting communication downlink signals to plural corresponding terrestrial communication cells. Method 130 implements the high aspect satellite communication of the present invention.

Process block 132 indicates that a first communication band is established to be shared and fully allocable among multiple adjacent terrestrial communication cells.

Process block 134 indicates that communication downlink signals are transmitted to a first high aspect arrangement of terrestrial communication cells that are each immediately adjacent to at least one other cell in the first high aspect arrangement.

It will be appreciated that satellite 10 also communicates with a communication system or network operations center and a satellite control center, as are known in the art. The network operations center, sometimes referred to as a NOC, controls and coordinates the transmission of communication over satellite 10. The network operations center obtains and maintains information about the communication traffic and the resource configuration of satellite. The satellite control center transmits and receives tracking, telemetry, and control signals for controlling satellite 10 and its operation.

In view of the many possible embodiments to which the principles of our invention may be applied, it should be recognized that the detailed embodiments are illustrative only and should not be taken as limiting the scope of our invention. For example, arrangements of transmit horns 36 and cells 74 are illustrated as being in 1-by-8 configurations. It will be appreciated, however, that other configurations transmit horns 36 and cells 74 could be formed in other high aspect arrangements described above. Accordingly, the invention includes all such embodiments as may come within the scope and spirit of the following claims and equivalents thereto.

What is claimed is:

1. In a communication satellite having plural communication signal transmit antennas that transmit communication downlink signals to plural corresponding terrestrial communication cells, the improvement comprising:

first and second contiguous, high aspect arrangements of transmit antennas, the first and second high aspect arrangements of transmit antennas transmitting the communication downlink signals to respective first and second high aspect arrangements of terrestrial communication cells in a terrestrial region that includes plural urban areas that each extend over a distance, the first and second high aspect arrangements of terrestrial communication cells each having a pair of transverse dimensions, one of which dimensions is greater than the other, the greater dimensions of the first second high aspect arrangements of terrestrial communication cells being greater than the largest distance over which any of the plural the urban areas extends; and first and second orthogonal communication band segments that are shared and fully allocable among the respective first and second high aspect arrangements of transmit antennas.

2. The satellite of claim 1 in which orthogonality of the first and second communication band segments includes transmitting them with orthogonal first and second polarizations, respectively.

3. The satellite of claim 1 in which the first and second communication band segments correspond to a common frequency spectrum and are distinguished by respective first and second polarizations.

4. The satellite of claim 1 in which the first and second high aspect arrangements of terrestrial communication cells have transverse dimensions with a ratio of at least 4-to-1.

5. The satellite of claim 1 in which the first and second high aspect arrangements of transmit antennas transmit the communication downlink signals to respective first and second high aspect arrangements of terrestrial communication cells in a terrestrial region that includes a coastline extending generally in a first direction, the greater dimensions of the first and second high aspect arrangements of terrestrial communication cells being oriented transverse to the first direction.

6. The satellite of claim 1 in which the high aspect arrangement of transmit antennas has first and second transverse dimensions that define for the arrangement an aspect ratio of at least 1:4.

7. The satellite of claim 1 in which orthogonality of the first and second communication band segments includes transmitting them with joint detection, successive interference cancellation, or parallel interference cancellation.

8. The satellite of claim 1 in which orthogonality of the first and second communication band segments includes transmitting them with orthogonal codes or near-orthogonal code.

9. The satellite of claim 1 in which the first and second communication bend segments each corresponds to substantially full bandwidth of a satellite communication band.

10. The satellite of claim 9 in which the satellite communication band is the Ku-band.

11. In a communication satellite system having plural communication signal transmit antennas that transmit communication downlink signals to plural corresponding terrestrial communication cells, a method of transmitting the communication downlink signals to the plural corresponding terrestrial communication cells, the method comprising:

establishing first and second orthogonal communication band segments that are shared and fully allocable among plural adjacent terrestrial communication cells; and transmitting communication downlink signals to first and second high aspect arrangements of terrestrial communication cells that are each immediately adjacent to at least one other cell in the first and second high aspect arrangements, the first and second high aspect arrangements of terrestrial communication cells each having a pair of transverse dimensions, one of which dimensions being greater than the other so that each of the first and second high aspect arrangements of terrestrial communication cells has an aspect ratio of at least about 1:4.

the first and second high aspect arrangements of terrestrial communication cells being transmitted to a terrestrial region that includes plural urban areas that each extend over a distance, the greater dimensions of the first and second high aspect arrangements of terrestrial communication cells being greater than the largest distance over which any of the plural the urban areas extends.

12. The method of claim 11 in which orthogonality of the first and second communication band segments includes transmitting them with orthogonal first and second polarizations, respectively.

13. The method of claim 11 in which the first and second communication band segments correspond to a common frequency spectrum and are distinguished by respective first and second polarizations.

14. The method of claim 11 in which the first and second high aspect arrangements of terrestrial communication cells are transmitted to a terrestrial region that includes a coastline extending generally in a first direction, the greater dimensions of the first and second high aspect arrangements of terrestrial communication cells being oriented transverse to the first direction.

15. The satellite of claim 11 in which the first and second communication band segments each corresponds to substantially full bandwidth of a satellite communication band.

16. The satellite of claim 11 in which the satellite communication band is the Ku-band.

17. In a communication satellite system having plural communication signal transmit antennas that transmit communication downlink signal to plural corresponding terrestrial communication cells, a method of transmitting the communication downlink signals to the plural corresponding terrestrial communication cells, the method comprising:

establishing first and second orthogonal communication band segments that are shared and fully allocable among plural adjacent terrestrial communication cells; and transmitting communication downlink signals to first and second high aspect arrangements of terrestrial communication cells that are each immediately adjacent to at least one other cell in the first and second high aspect arrangements, the first and second high aspect arrangements of terrestrial communication cells each having a pair of transverse dimensions, one of which dimensions being greater than the other so that the first and second high aspect arrangements extend to opposed ends, the first high aspect arrangement being positioned end-to-end and co-linear with the second high aspect arrangement.

18. The method of claim 17 in which compatible downlink signals are transmitted to terrestrial communication cells that are adjacent to each other at the ends of the respective first and second high aspect arrangements.

19. The method of claim 18 in which the first and second high aspect arrangements of terrestrial communication cells are transmitted to a terrestrial region that includes plural urban areas that each extend over a distance, the greater dimensions of the first and second high aspect arrangements of terrestrial communication cells being greater than the largest distance over which any of the plural the urban areas extends.

20. The method of claim 18 in which the first and second high aspect arrangements of terrestrial communication cells are transmitted to a terrestrial region that includes a coastline extending generally in a first direction, the greater dimensions of the first and second high aspect arrangements of terrestrial communication cells being oriented transverse to the first direction.

* * * * *